— 
United States Patent Office 3,364,172
Patented Jan. 16, 1968

---

3,364,172
NITROPHENOL STABILIZED COMPOSITIONS OF POLYOLEFINS
Stanley Tocker, New Castle County, Del., assignor to E. I. du Pont de Nemours and Company, Wilmington Del., a corporation of Delaware
No Drawing. Filed Sept. 24, 1962, Ser. No. 225,862
8 Claims. (Cl. 260—45.9)

This invention relates to polyolefin compositions and more particularly to polyolefin compositions which are stable toward thermal and ultraviolet light degradation by the incorporation of an alkyl substituted mononitrophenol.

It is known that many organic polymeric structures such as structures of polyethylene, polypropylene and the like deteriorate when subjected to sunlight or to high temperatures. It is, therefore, clear that materials of this type have need for stabilization against both thermal and ultraviolet light degradation, especially in wave lengths approaching the visible, especially about 4000 A.

It is also known that some thermal stabilizers incorporated in polyolefins such as the aromatic amines have a tendency to sensitize the polyolefin to photodegradation. Furthermore, the compatibility of many conventional thermal stabilizers in polyolefins is low, that is, no more than 0.1 to 0.2% by weight of the thermal stabilizer can be incorporated in the polyolefin structure without excessive exudation.

It is, therefore, an object of this invention to provide polyolefin compositions.

It is a further object of this invention to provide polyolefin compositions which are stable toward both thermal and ultraviolet light degradation by the incorporation therein of an alkyl substituted mononitrophenol. These and other objects will appear hereinafter.

The compositions of the present invention are attained by intimately incorporating within a polymer of an $\alpha$-monoolefin such as polyethylene and polypropylene, a small amount, e.g., 0.1 to 10 and preferably 0.5 to 3% by weight, based on the total weight of the composition of an alkyl mononitrophenol compound of the formula:

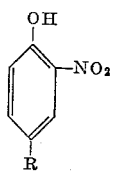

wherein R is an alkyl radical of from 10 to 22 carbon atoms, preferably 12 to 16 carbon atoms. The preferred polyolefins are polyethylene and polypropylene in film form and the most preferred alkyl nitrophenol compound is 4-dodecyl-2-nitrophenol.

It has been unexpectedly found and, therefore, important to the present invention, that the alkyl mononitrophenol compound is outstandingly compatible with polyolefins when the alkyl group contains from 10 to 22 carbon atoms. The compounds are compatible even at high concentrations, e.g., 3 to 10%, without detracting from their effective use as stabilizing agents against the effects of heat and ultraviolet light. Alkyl mononitrophenol having the alkyl radical other than 10 to 22 carbon atoms, i.e., 1 to 9 carbon atoms, have reduced compatibility with polyolefins.

The polyolefin polymers which can be employed are preferably the polymers of $\alpha$-monoolefins having up to 6 carbon atoms. Such $\alpha$-monoolefins include ethylene, propylene, 1-butene, 1-pentene and 1-hexene as well as their branched chained members such as 3,3-dimethyl-butene-1 and the like.

The stabilized compositions of the invention can be prepared in any manner which will intimately blend or incorporate the above described alkyl mononitrophenol stabilizing agent therein. Such techniques would include heat-plastifying the polyolefin on compounding rolls, in a Banbury mixer or plastics extruder while charging the apparatus with the desired proportion of stabilizing agent.

The invention can be better understood by referring to the following examples:

EXAMPLE I

A. Preparation of 4-dodecyl-2-nitrophenol

To a solution of 3.1 ml. of concentrated nitric acid in 9.0 ml. of glacial acetic acid at $-10°$ C. is added dropwise with vigorous stirring a solution of 5.0 g. of p-dodecylphenol in 5.0 ml. of acetic acid. The mixture is stirred for 1.5 hours after addition is completed and then poured onto approximately 200 g. of ice. The organic phase is extracted with ether; the combined ether extracts are then extracted with 350 ml. portions of 5% aqueous sodium bicarbonate. After drying the ether solution over anhydrous sodium and removal of ether, 4.8 g. of yellow oil is obtained which has an ultraviolet spectrum essentially identical to that of ortho-nitrophenol.

B. Preparation of blend of polyethylene with 4-dodecyl-2-nitrophenol

A solution of 0.5 g. of the nitrophenol indicated above in 50 ml. of benzene is mixed with 49.5 g. of "Alathon" 6 polyethylene resin. The polymeric mixture is dried at 100° C. in a vacuum oven and is then pressed into sheets of transparent films at 125° C. and 30 tons pressure. Samples of the film and controls without the stabilizer are submitted to exposure from a bank of Westinghouse FS Ultraviolet Sunlamps. The polyethylene control film without the stabilizer is embrittled at 150 hours; the test film containing 1% by weight of the nitrophenol stabilizer shows no evidence of embrittlement after 800 hours exposure to the sunlamps.

The same composition is extruded through a melt extruder into film. The resin containing the ortho-nitrophenol can be extruded at a linear rate of approximately 40% higher than that of the same resin without the alkylated nitrophenol stabilizer.

EXAMPLES II–VIII

Following the procedure described in Example I, test polyolefin compositions are prepared incorporating alkylated nitrophenols having alkyl groups of various chain length. The stabilized compositions are formed into films by melt extrusion. In all cases the linear extrusion rate is 35 to 45% higher than that attainable without the alkylated nitrophenol stabilizer. The results of these experiments are shown in Table I.

TABLE I

| Ex. | R | Conc., Percent | Polyolefin | Sunlamp Exposure Before Failure (hours) |
|---|---|---|---|---|
| 2 | Dodecyl | 1.0 | Polypropylene | 700 |
| 3 | Hexadecyl | 1.0 | Polyethylene | 1,200 |
| 4 | Octadecyl | 1.0 | ---do--- | 1,500 |
| 5 | Docosyl | 1.0 | Polypropylene | 700 |
| 6 | Decyl | 1.0 | ---do--- | 600 |
| 7 | Dodecyl | 4.0 | Polyethylene | 2,500+ |
| 8 | Hexadecyl | 2.0 | Polypropylene | 1,600 |

EXAMPLE IX

Following the procedure of Example I–B, various stabilizers are incorporated in polyethylene ("Alathon" 6) and the resulting compositions pressed into 10 mil thick films. For a control, a conventional anti-oxidant, "Santowhite" which is 4,4'-butylidene - bis(6-t-butyl-m-cresol) obtained from Monsanto Chemical Company is incorporated into the same resin. The samples are heated in an air oven at 210° C. for 25 minutes and degradation of the sample is checked by measuring infrared absorption of the pressed films in the 1700–1750 cm.$^{-1}$ region, which is characteristic of the carbonyl group which is formed upon degradation. The results are shown in Table II.

TABLE II

| Stabilizer: | Infrared absorption (1700–1750 cm.$^{-1}$) |
|---|---|
| "Santowhite"— | |
| 0.5 weight percent | Some |
| 1.0 weight percent | None |
| 4-octadecyl-2-nitrophenol— | |
| 0.5 weight percent | Some |
| 1.0 weight percent | None |
| 4-dodecycloxy - 2-hydroxybenzophenone, 1.0 weight percent | Strong |
| 4-methoxy - 2 - hydroxybenzophenone, 1.0 weight percent | Strong |

In addition to their stabilizing action against ultraviolet light degradation, the higher alkyl substituted mononitrophenols are as effective in thermal stabilization as a conventional antioxidant and more effective toward thermal degradation than other known ultraviolet light stabilizers.

The main advantage of the alkyl mononitrophenol stabilizers of this invention is that they function both as stabilizer against thermal degradation as well as degradation from the action of ultraviolet light while being compatible even at high concentrations. Furthermore, the above described alkyl mononitrophenols are compatible with the polyolefins over a wide range of composition thus making it possible to incorporate as much thermal stabilizer as might be desired without, at the same time, causing the polyolefin to be more sensitive to photodegradation from the action of ultraviolet light. A further advantage is that the above described alkyl mononitrophenols protect the polyolefin against very damaging wave lengths bordering on the visible. Thus, the stabilizers lend themselves well to the production of articles which will encounter severe conditions of weathering since they can be incorporated in the polyolefin in high concentration and they are protective against the very damaging portion of the ultraviolet spectrum.

What is claimed is:

1. A composition resistant to thermal and ultraviolet light degradation comprising: about 90 to 99.9% by weight of a polymer of an α-monoolefin and about 10 to 0.1% by weight of an alkyl-substituted mononitrophenol of the formula:

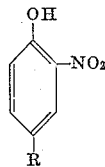

wherein R is an alkyl radical of from 10 to 22 carbon atoms.

2. The composition of claim 1 wherein the polymer of said α-olefin is polyethylene.

3. The composition of claim 1 wherein the polymer of said α-olefin is polypropylene.

4. The composition of claim 1 wherein R is an alkyl radical of from 12 to 16 carbon atoms.

5. A composition resistant to thermal and ultraviolet light degradation comprising: about 97 to 99.5% by weight of a polymer of an α-monoolefin selected from the group consisting of polyethylene and polypropylene and about 3 to 0.5% by weight of an alkyl-substituted mononitrophenol of the formula:

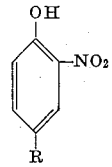

wherein R is an alkyl radical of from 12 to 16 carbon atoms.

6. The composition of claim 5 wherein the alkyl-substituted nitrophenol is 4-dodecyl-2-nitrophenol.

7. A composition resistant to thermal and ultraviolet light degradation comprising: about 99% by weight of polyethylene and about 1% by weight of 4-dodecyl-2-nitrophenol.

8. A composition resistant to thermal and ultraviolet degradation comprising: about 99% by weight of polypropylene and about 1% by weight of 4-dodecyl-2-nitrophenol.

References Cited

UNITED STATES PATENTS

| 2,868,844 | 6/1959 | Coffield et al. | 260—45.9 |
| 2,943,075 | 6/1960 | Schweitzer | 260—45.9 |
| 2,985,617 | 5/1961 | Salyer et al. | 260—45.9 |

DONALD E. CZAJA, *Primary Examiner.*

LEON J. BERCOVITZ, *Examiner.*

H. E. TAYLOR, *Assistant Examiner.*